(No Model.)
J. B. CARTER.
FODDER COMPRESSOR.
No. 605,220. Patented June 7, 1898.
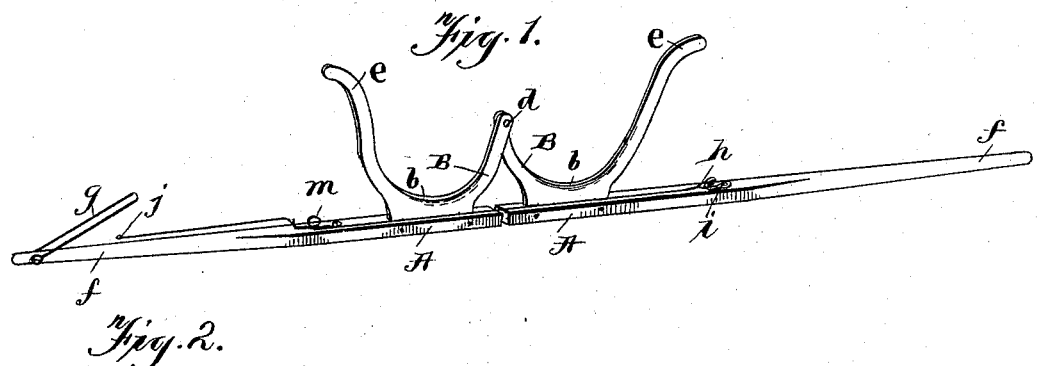
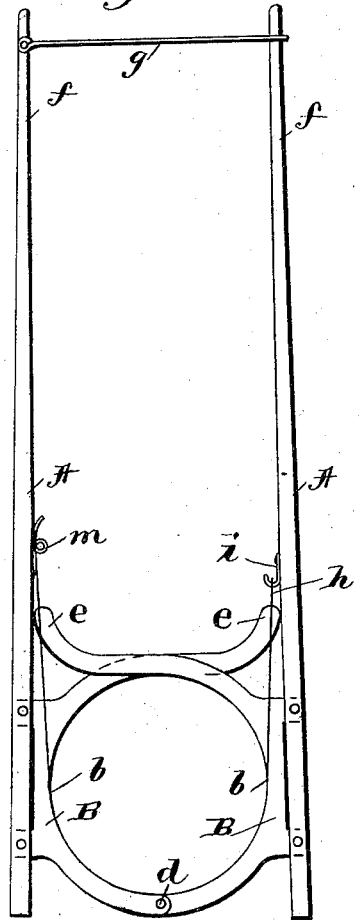
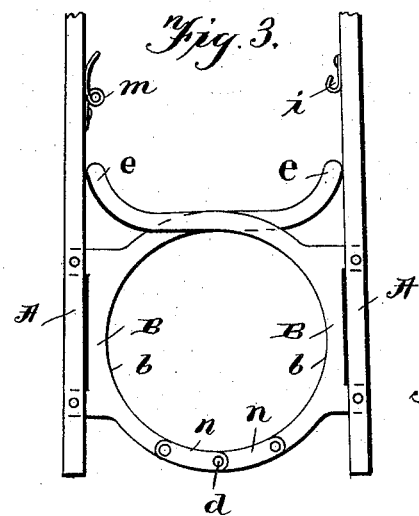
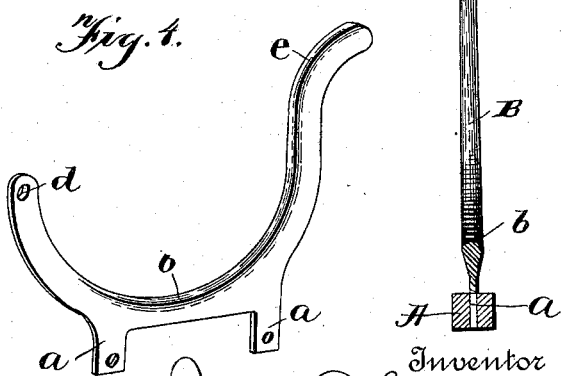
Witnesses
Geo. E. Frech.
J. Frank Barnes.
Inventor
James B. Carter,
by Pattison Nesbit
Attorneys

UNITED STATES PATENT OFFICE.

JAMES B. CARTER, OF CULPEPER, VIRGINIA.

FODDER-COMPRESSOR.

SPECIFICATION forming part of Letters Patent No. 605,220, dated June 7, 1898.

Application filed August 9, 1897. Serial No. 647,622. (No model.)

*To all whom it may concern:*

Be it known that I, JAMES B. CARTER, of Culpeper, in the county of Culpeper and State of Virginia, have invented certain new and useful Improvements in Fodder-Compressors; and I do hereby declare the following to be a full, clear, and exact description of the invention, such as will enable others skilled in the art to which it pertains to make and use it, reference being had to the accompanying drawings, which form part of this specification.

My invention relates to improvements in fodder-compressors; and it pertains to a hand-compressor adapted to be taken in the field for compressing bundles of fodder or other similar material and holding them while being bound, all of which will be fully described hereinafter and particularly pointed out in the claims.

The object of my invention is to provide a simple and cheap hand fodder-compressor adapted to be taken in the field for compressing bundles of fodder or other similar agricultural products and holding the bundles compressed while a binding-cord is applied thereto.

In the accompanying drawings, Figure 1 is a perspective view of my fodder-compressor, showing it in an open position to receive the material to be compressed. Fig. 2 is a view showing the compressor closed. Fig. 3 is a view showing a modification of the hinging-point of the compressing-arms. Fig. 4 is a detached perspective view of one of the compressing-arms. Fig. 5 is an edge view of one of the compressing-arms, showing it in section.

Referring to the drawings, A indicates the operating-levers, and B the compressing-arms. The compressing-arms B are connected to the inner side of one end of the operating-levers A and connected at the two points $a$, which, as here shown, are arms extending into openings made in the levers, through which the securing-rivets pass, as clearly shown in the drawings. These compressing-arms consist, essentially, of curved circular segments, which preferably, when the compressor is closed, as shown in Figs. 2 and 3, form a circle and compress the material into a bundle which is circular in cross-section. The inner edges $b$ of these arms are thickened and rounded, as shown, to prevent cutting of the fodder or other material compressed, while the outer edges of the arms are made thin, preferably, as shown in Fig. 5, for the purpose of a saving in material and to accomplish lightness.

It will be noted that the compressing-arms B are connected intermediate their ends rigidly to the levers and near one end thereof, the inner ends of the compressor-arms being pivotally connected in Figs. 1 and 2 at the point $d$, which forms a pivotal point or hinge for the compressor in its opening and closing actions. The opposite and free ends of the compressor are turned outward preferably, as shown at $e$, and elongated beyond the half of a complete circle, so that their ends will preferably engage the inner side of the opposite lever A, forming a stop to indicate when the bundle is properly compressed and also to form an enlarged opening or mouth to receive the material to be compressed as it is being placed therein, as clearly illustrated in Fig. 1. As shown in this figure, it will be noted that the free ends of the compressing-arms are curved outward, which facilitates the placing of the material to be compressed in position for the compressing action.

The levers A may be made of any desired length for providing the proper leverage, and a handle $f$ is provided with a holding-loop $g$, whereby after the bundle has been compressed the loop is passed over the ends of the lever to hold them in the compressed position while the binding-cord is being applied.

I preferably use in connection with my compressor a short binding-cord, which cords are provided at one end with a loop $h$, adapted to catch over a hook $i$ upon one of the levers A, and at the opposite end with a knot $j$. The other lever A is provided with a combined holding and tension spring $m$ of any desired construction for holding the cord with some tension against the lever A. The object of this is to enable the cord to be stretched along the levers, as shown in Fig. 1, and caught under the springs $m$, whereby the cord is held taut while the compressor is being closed, which causes the cord to fold tightly around the bundle, as shown in Fig. 2, and to be in the proper position to have the knotted end of the cord passed through its looped end and securely fastened around the bundle. By the use of short binding-cords considerable time is saved in the binding of the bundle in comparison with using the cord from a ball of twine, as the cords can be prepared by the farmer at times when he cannot perform outside work. It avoids the necessity of cutting and forming the cords in the field, which is a considerable saving of time.

In Figs. 1 and 2 I show the compressing-arms rigid throughout their length with one of their ends pivotally connected. This construction, however, may be varied without departing from the spirit of my invention, one variation being, for instance, the intervention of links $n$ with their ends flexibly or pivotally connected, as illustrated in Fig. 3.

In my device the essential features are the use of the levers with the compressor-arms connected to the levers near one end and intermediate the ends of the compressing-arms. This construction is not only simple and cheap, making a device, as illustrated in Figs. 1 and 2, consisting only of the levers, the compressing-arms, and a loop $g$, together with the spring and hook for holding the cords. The levers, as shown in Fig. 1, serve as a base for holding the compressor in the proper position to receive the fodder or other material to be compressed, thus performing the double function of a base and compressing-levers. The levers are preferably made of wood, while the compressing-arms are made, preferably, of malleable metal, the whole producing a hand fodder-compressor adapted to be carried to the desired point in the field and there used to compress the material. Attention is also directed to the fact that when the compressor is in the position shown in Fig. 2, with the material compressed, the lower end of the lever A serves as a means to prevent the rolling of the bundle and holds it in the proper position to be bound most conveniently.

Having thus described my invention, what I claim, and desire to secure by Letters Patent, is—

1. A bundle-compressor comprising two levers, two curved compressing-arms intermediately connected to the inner sides of the levers, the inner ends of the compressing-arms swingingly connected to each other, substantially as described.

2. A bundle-compressor comprising two levers, rectangular in cross-section, curved compressor-arms connected to the inner sides of one end of the levers, the inner ends of the compressor-arms swingingly connected to each other, whereby the levers form a base when the compressor is unfolded for receiving the material to be compressed, substantially as described.

3. A bundle-compressor comprising two levers, curved compressor-arms secured intermediate their ends to the inner sides of the levers, one end of the compressor-arms swingingly connected to each other, substantially as described.

4. A bundle-compressor comprising two levers, curved compressing-arms secured to the inner sides of one end of the levers and having one of their ends swingingly connected to each other, and a holding-loop at the opposite or handle ends of the levers, substantially as described.

5. A bundle-compressor comprising two levers, curved compressing-arms having at their outer sides two connecting-points attached to the inner sides of the levers to hold the arms rigid therewith, one end of the compressing-arms swingingly connected to each other, and their opposite ends left free to separate, substantially as described.

6. A bundle-compressor comprising two levers, curved compressing-arms secured to the inner sides of the levers at one end thereof, the compressing-arms swingingly connected to each other at one end, one end of the levers having a hook to receive one end of a binding-twine and the other a friction device to receive the other end of the cord, the parts operating in the manner and for the purpose described.

7. A bundle-compressor comprising two levers, curved compressing-arms secured intermediate their ends to the inner sides of the levers, and at one end thereof, one end of the compressing-arms swingingly connected to each other and the other and free ends of the compressing-arms being elongated and curved outward, substantially as described.

8. A bundle-compressor comprising two levers, curved compressing-arms secured to the inner sides of the levers near one end thereof, the inner ends of the compressing-arms swingingly connected to each other, and the adjacent ends of the levers extended to form projections to prevent the rolling of the bundle after being compressed, substantially as described.

In testimony whereof I affix my signature in presence of two witnesses.

JAMES B. CARTER.

Witnesses:
J. GEO. HIDEN,
C. J. REFUS, Jr.